(12) United States Patent
Bierweiler et al.

(10) Patent No.: US 10,739,744 B2
(45) Date of Patent: Aug. 11, 2020

(54) AUTOMATED DETERMINATION OF A PARAMETERIZATION OF AN EVALUATION METHOD

(71) Applicant: Siemens Aktiengesellschaft, Munich (DE)

(72) Inventors: Thomas Bierweiler, Karlsruhe (DE); Jean Pascal John, Karlsruhe (DE); Daniel Labisch, Karlsruhe (DE); Bernd-Markus Pfeiffer, Woerth (DE)

(73) Assignee: Siemens Aktiengesellschaft, Munich (DE)

( * ) Notice: Subject to any disclaimer, the term of this patent is extended or adjusted under 35 U.S.C. 154(b) by 80 days.

(21) Appl. No.: 16/196,397

(22) Filed: Nov. 20, 2018

(65) Prior Publication Data

US 2019/0155241 A1   May 23, 2019

(30) Foreign Application Priority Data

Nov. 22, 2017   (EP) ...................................... 17203055

(51) Int. Cl.
| | |
|---|---|
| *G05B 19/042* | (2006.01) |
| *G05B 19/418* | (2006.01) |
| *G06F 17/18* | (2006.01) |
| *G05B 23/02* | (2006.01) |

(52) U.S. Cl.
CPC ....... *G05B 19/0428* (2013.01); *G05B 19/042* (2013.01); *G05B 19/4183* (2013.01); *G05B 23/0275* (2013.01); *G06F 17/18* (2013.01)

(58) Field of Classification Search
None
See application file for complete search history.

(56) References Cited

U.S. PATENT DOCUMENTS

| | | | | |
|---|---|---|---|---|
| 5,307,262 A | * | 4/1994 | Ertel | ...................... G16H 15/00 |
| | | | | 705/2 |
| 6,961,728 B2 | * | 11/2005 | Wynblatt | ................ H04L 67/10 |
| 7,194,369 B2 | * | 3/2007 | Lundstedt | ............ G01N 21/274 |
| | | | | 702/104 |

(Continued)

FOREIGN PATENT DOCUMENTS

| | | |
|---|---|---|
| DE | 102008058964 | 5/2010 |
| EP | 3065015 | 9/2016 |
| WO | WO2010/133234 | 11/2010 |

*Primary Examiner* — Ramesh B Patel
(74) *Attorney, Agent, or Firm* — Cozen O'Connor

(57) ABSTRACT

A method for automatically determining a parameterization of an evaluation method via a computer includes generating a comparison data set and storing reference data in the generated comparison data set, stipulating a parameterization with which identification of particular partial data items of reference data items stored in the comparison data set is influenceable via the evaluation method, such that a relative number of partial data items identified during the evaluation in relation to all the reference data items stored in the generated comparison data set is quantitatively smaller than a predetermined threshold value, preferably smaller than 10%, preferably smaller than 5%, particularly preferably smaller than 1%, and providing the determined parameterization for performing the evaluation method to identify particular partial data items of the data set of the industrial plant.

28 Claims, 3 Drawing Sheets

(56) References Cited

U.S. PATENT DOCUMENTS

| | | | | |
|---|---|---|---|---|
| 8,046,090 B2* | 10/2011 | MacArthur | ............ | G05B 17/02 |
| | | | | 700/32 |
| 2008/0125877 A1* | 5/2008 | Miller | .................... | G05B 15/02 |
| | | | | 700/29 |
| 2012/0203543 A1* | 8/2012 | Folmer | ............. | G06F 16/90344 |
| | | | | 704/9 |
| 2013/0198296 A1* | 8/2013 | Roy | ........................ | H04L 51/16 |
| | | | | 709/206 |
| 2015/0095718 A1* | 4/2015 | Otsuka | ................ | G06F 11/3409 |
| | | | | 714/47.3 |
| 2016/0072866 A1* | 3/2016 | Voss | ....................... | H04L 65/601 |
| | | | | 709/219 |
| 2016/0259328 A1* | 9/2016 | Heiler | ................ | G05B 23/0221 |

* cited by examiner

AUTOMATED DETERMINATION OF A PARAMETERIZATION OF AN EVALUATION METHOD

BACKGROUND OF THE INVENTION

1. Field of the Invention

The invention relates to a method for acquiring an automated determination of a parameterization of an evaluation method by means of a computer, where the evaluation method is suitable and is provided for the identification of particular partial data items of a data set of an industrial plant comprising a manufacturing or processing plant, and relates to an associated computer program with program code instructions that are executable by a computer, a storage medium and a computer system.

2. Description of the Related Art

In the field of manufacturing and process technology plants, evaluation methods are often used to evaluate various data of the plants and, for example, to perform an optimization of the plant. For the use of these evaluation methods, typically a parameterization is required that can comprise a plurality of individual parameters.

The parameters of the evaluation methods must be specified, for example, by users or start-up engineers of the technical plant. The specification of the parameters can prove to be complex because, for example, the relationships between the individual parameters and the result of the evaluation are not known, are insufficiently documented or are difficult to understand. As the complexity and effort of the parameterization increases, the acceptability or usefulness of particular evaluation methods can become so low that the evaluation methods are not used, although they would bring about an increase in the efficiency of the technical plant.

In addition, the specification of the parameterization is often based upon the experience of the users or start-up engineers so that in some circumstances a high degree of dependency on the availability of individual persons can be the result.

It is known to try out possible parameterizations according to the trial and error method and to compare the respective results with one another. This process can be at least partially automated if the parameter-dependent quality level of the results can be objectified accordingly. However, this method is, particularly for complex or extensive parameterizations, comparatively time-consuming. In addition, no reliable statement can be made in this regard as to whether meaningful parameters could be found for the respective evaluation methods.

Furthermore, with conventional evaluation methods, in some cases, special solutions as to how the parameterization of these evaluation methods can occur are also known. In control engineering, the parameterization of a PID controller, for example, based on the evaluation of the process output can occur upon a jump in the setpoint value. Otherwise expressed, a parameterization of an evaluation algorithm occurs based on a response to changes of the system to be evaluated.

DE 10 2008 058 964 A1 discloses a parameterization of a control method in which control parameters are determined dependent upon a system deviation and/or a setpoint change and/or via manual specification.

In EP 3 065 015 A1, a diagnosis device for monitoring a control loop is disclosed in which changes to the parameterization of the control can be undertaken by an operator.

SUMMARY OF THE INVENTION

It is an object of the invention to provide a method for parameterization of an evaluation method that is suitable and provided for the identification of particular partial data items of a data set of an industrial plant, in particular a manufacturing or processing plant, which method can be performed fully automatically at a relatively low cost.

This and other objects and advantages are achieved in accordance with the invention by a method for the automated determination of a parameterization of an evaluation method via a computer, a computer program with program code instructions that are executable by a computer, a storage medium with a computer program executable by a computer and a computer system, where the evaluation method is suitable and is provided for the identification of particular partial data items of a data set of an industrial plant, in particular a manufacturing or processing plant.

In a method for the automated determination of a parameterization of an evaluation method via a computer, the object is achieved in accordance with the invention by the following method steps:

a) generating a comparison data set and storing reference data in the comparison data set, where a number of the reference data items stored in the comparison data set substantially corresponds to the number of data items that are part of the data set of the industrial plant and where the comparison data set has statistical properties comparable with the data set of the industrial plant, in particular a quantitatively identical temporal extent and/or an identical value range of the reference data and/or an identical number of different data types and/or identical data types and/or an identical variance of data types, b) using the evaluation method for evaluating the reference data items stored in the comparison data set, c) stipulating a parameterization with which the identification of particular partial data items of the reference data items stored in the comparison data set is influenceable via the evaluation method such that a relative number of the partial data items identified in the evaluation in relation to all the reference data items stored in the comparison data set is quantitatively smaller than a predetermined threshold value, preferably smaller than 10%, preferably smaller than 5%, particularly preferably smaller than 1%, and d) providing the determined parameterization for performing the evaluation method for identification of particular partial data items of the data set of the industrial plant.

The parameterization can concern, though without being restricted thereto, threshold values, range limits, data types and the like that are needed for applying the evaluation method. The evaluation method can be any method that is used or can be used for evaluating data sets in the context of industrial plants, in particular manufacturing or processing plants. It is a condition only that in the context of the evaluation method, a particular subset of the data set is identified as "hits". The data set can comprise any data in digital form that can originate from sensors, actuators, control devices, management systems and the like used in industrial plants. The method in accordance with the invention is executable in an automated manner on a computer, microprocessor or the like.

The core concept of the invention lies therein that the parameterization of the evaluation method is learned automatically by applying the evaluation method on a comparable data set. The data set comparable from a statistical viewpoint with the actual data set to be analyzed with the evaluation method is initialized therefor and is filled with reference data items. The reference data items can be purely random data. The reference data set can however also be selected so that a particular known result can be expected on use of the evaluation method on the comparison data set.

The parameterization of the evaluation method is then determined in a, possibly iterative, process so that only a subset of data that lies below a threshold value to be predetermined is identified as hits by the evaluation method. The threshold value is advantageously to be selected relatively low in order to achieve good results for the evaluation method. In a boundary case, the threshold value can also be specified so that substantially no hits are identified. The more statistical properties of the comparison data set with which the data set to be evaluated via the evaluation method overlap, the better results the method in accordance with the invention delivers.

The method in accordance with the invention determines only the parameters with which the identification of particular partial data items of the reference data items stored in the comparison data set is influenceable via the evaluation method. In order to be able to differentiate influencing from non-influencing parameters, in the context of the method in an automatically running trial and error process, the evaluation method can be applied to the comparison data set. Any change to the hits herein implies an influencing potential of individual parameters. It is also possible that the influencing parameters are taken from a database or the like in which a correlation of different types of evaluation methods and associated parameters is stored. By taking exclusive account of parameters influencing the evaluation method, the method in accordance with the invention is made extremely efficient and resource-conserving.

Underlying the method in accordance with the invention is the assumption that in the (real) data set, both random and also systematic relations between the individual data items are present. However, the evaluation method typically has the task of identifying only the systemic relations in the (real) data set. By using the method in accordance with the invention, all or at least almost all random relations can be excluded from the evaluation of the (real) data set. In other words, with the specifically constructed reference data set, evaluation methods can be optimized automatically in that undesired interfering influences are minimized via the optimized parameterization. Through the parameterization provided by the method in accordance with the invention, an efficiency, quality and significance of the evaluation method can be significantly increased.

In an alternative embodiment of the method for the automated determination of a parameterization of an evaluation method via a computer in accordance with the invention, where the evaluation method is suitable and is provided for the identification of particular sequences of messages placed in a message archive of an industrial plant, in particular a manufacturing or processing plant, the method comprises the following steps:

a) creating a comparison archive and storing reference messages in the comparison archive, a number of the reference messages stored in the comparison archive substantially corresponding to the number of messages which are part of the message archive of the industrial plant, and where the comparison archive has statistical properties comparable with the message archive of the industrial plant, in particular a quantitatively identical temporal extent and/or an identical value range of the reference messages and/or an identical number of different message identifications and/or identical message identifications and/or a variance of message identifications, b) using the evaluation method for identification of the particular sequences of the reference messages stored in the comparison archive, c) stipulating a parameterization with which the identification of particular sequences of messages of the reference messages stored in the comparison archive is influenceable via the evaluation method such that a relative number of particular sequences identified in the evaluation in relation to all the sequences stored in the comparison archive is quantitatively smaller than a predetermined threshold value, preferably smaller than 10%, preferably smaller than 5%, particularly preferably smaller than 1%, and d) providing the determined parameterization for performing the evaluation method for identification of particular sequences of the messages stored in the message archive.

The method set out in the preceding section substantially follows the previously described central concept of the present invention. The method is used for the automated determination of the optimum or, for the respective specific application case, particularly advantageous parameterization of an evaluation method which is performed for the identification of particular sequences of messages stored in a message archive of an industrial plant. The expression "message" should be understood below as any notification or report of any event that occurs within the industrial plant.

The messages herein each have a particular message identification that typically differs at least partially from message to message. The message identification can comprise, for example, an assignment to a particular machine, a sensor or an actuator, or a message class (alarm or operating intervention).

In embodiments of the previously described methods in accordance with the invention, the stipulation of the parameterization can comprise a step-wise stipulation of a plurality of subparameters of the evaluation method. For this, in the determination of the respective subparameters, mutually different threshold values can be used. However, it is essential that at the end, i.e., following determination of all the subparameters, the relative number of the partial data items identified or sequences determined in the evaluation is smaller in relation to all the reference data items stored in the comparison data set than the previously determined (total) threshold value.

A sequence in which the individual subparameters are determined can either be discretionary or can be predetermined by a manufacturer or a user of the industrial plant.

In the event that in the context of the method in accordance with disclosed embodiments of the invention, a plurality of equal-valued parameter combinations are determined, either one of the parameter combinations can be selected in a discretionary manner as the result or can be left to a user of the method to make a manual choice of the result.

It is also an object of the invention to provide a method for the automated determination of a parameterization of an evaluation method via a computer, where the evaluation method is used for evaluating a message archive with a set of messages that are generated during control or monitoring of an industrial plant, in particular a manufacturing or processing plant, and where the messages have at least two message identifications differing from one another. The method comprises the following steps:

a) creating a comparison archive and storing reference messages in the comparison archive, a set of the reference messages stored in the comparison archive substantially corresponding to the set of messages which are stored in the message archive, and where the comparison archive has statistical properties comparable with the message archive of the industrial plant, in particular a quantitatively identical temporal extent and/or an identical value range of the reference messages and/or an identical number of different message identifications and/or identical message identifications and/or a variance of message identifications, b) determining an absolute occurrence frequency of individual message identifications within the set of reference messages stored in the comparison archive, c) determining a transition probability of, in each case, two message identifications in all the message identifications of the reference messages stored in the comparison archive via the respective absolute occurrence frequency, d) determining a threshold parameter for a minimum transition probability between two message identifications such that a relative number of pairs of message identifications, the transition probabilities of which, after the determination of the threshold parameter, lie above the threshold parameter to be determined, in relation to all the pairs of message identifications stored in the comparison archive is quantitatively smaller than a predefined first threshold value, preferably smaller than 10%, preferably smaller than 5%, particularly preferably smaller than 1%, and e) providing the determined parameterization for carrying out the evaluation method for evaluating the message archive.

In the context of the presently contemplated embodiment of the method in accordance with the invention, statistical dependencies between individual message identifications of the set of messages in the message archive are determined in order, for example, to be able to perform an adaptation of an alarm parameterization of the process technology or production technology plant in a simplified and targeted manner. The method is based upon the assumption that different message identifications also have a certain dependency upon one another with a significant transition probability. Significant in this context means that the transition probability lies quantitatively above the predetermined first threshold value.

The threshold parameter for the transition probability is selected in the context of the method such that following the application of the evaluation method to the comparison archive, a set of hits (as sufficiently probable or often occurring identified sequences of message identifications) is smaller than the predetermined first (overall) threshold value of the method. It should herein be noted that the threshold parameter and the previously-determined first (overall) threshold value of the method are two different parameters. The threshold parameter represents the result of the method as the parameterization of the evaluation method, whereas the first (overall) threshold value represents a parameter of the determination method itself. With regard to a detailed explanation of the difference, reference is also made to the description of the exemplary embodiment.

In a particularly preferred embodiment of the above-described methods in accordance with the invention, the following steps are additionally performed between method steps d and e:

i) identifying a first message which has a first message identification and a second temporally subsequent message which has a second message identification, where the associated transition probability from the first message identification to the second message identification must be quantitatively greater than the first threshold parameter for the minimum transition probability between two message identifications and wherein the second message identification must be findable in the comparison archive within a time span to be fixed, starting from the first message identification, ii) combining the two identified messages as a 2-part chain, iii) repeating the steps i) and ii) for each message stored in the comparison archive, iv) starting from a second message of a 2-part chain that has a second message with a second message identification, searching through the set of messages within the stipulated time span for further, temporally subsequent messages until an end of the time span is reached, v) taking account of the respective further message if the transition probability of the temporally previous message identification toward the further message identification is quantitatively greater than the threshold parameter for the minimum transition probability between two message identifications, vi) combining the further messages found together with the first and second message as a further chain, in particular a 3-part chain, a 4-part chain or a 5-part chain, vii) repeating the steps v) and vi) for each previously identified 2-part chain, viii) determining an absolute occurrence frequency of individual chains, and ix) determining a threshold parameter for a minimum relative occurrence frequency of a chain such that a relative occurrence frequency of chains that lie quantitatively above the threshold parameter, in relation to all the chains of message identifications identified in the comparison archive is quantitatively smaller than a second previously determined threshold value, preferably smaller than 10%, preferably smaller than 5%, maximally preferably smaller than 1%.

With regard to the expression "time span", in the context of the previously described embodiments of the method in accordance with the invention, a first message with a first message identification is taken as the basis. Subsequently, in the comparison archive, a search is performed for a second message with a second message identification (different from the first message identification). The second message identification must, however, not occur later than is defined by the specified time span.

If the first message has occurred with the first message identification, for example, at the absolute time t=25 min and the time span has been set at 5 min, then the second message with the second message identification must have occurred between the absolute time t=25 min and t=30 min, in order to be taken into account. In the framework defined, therefore, an absolute time span is used, i.e., when the time span has expired, starting from the determined second message identification, the search for further message identifications which could be part of a chain to be identified is ended.

Starting from the second message with the second message identification, a search of the comparison archive is performed for further temporally subsequent messages until an end of the time span is reached. The further message or the further messages are correspondingly only taken into account if the transition probability of the message identification lying temporally therebefore to the further message identification lies above the first threshold parameter.

The further messages found are identified together with the first and second message as a further chain, in particular a 3-part chain, a 4-part chain or a 5-part chain. The method steps set out above are subsequently applied in each of the 2-part chains identified in the comparison archive. As the result, all the possible 2-part, 3-part, 4-part, etc. chains within the comparison archive are obtained. By this means, more complex relationships between individual message identifications can be acquired and evaluated.

In the further implementation of the method, less relevant chains and/or groups of messages are distinguished from more significant ones. For this purpose, only chains that lie above a second threshold parameter are taken into account. The second threshold parameter is advantageously determined so that a relative number of chains of message identifications that are identified as hits is quantitatively smaller than a previously determined (partial) threshold value. This partial threshold value need not necessarily match the (partial) threshold value that was used for determining the first threshold parameter.

The parameterization determined comprises, in the case of the previously explained development of the method, a first threshold parameter for a minimum transition probability between two message identifications and a second threshold parameter for a minimum relative occurrence frequency of a chain of message identifications. It lies within the context of the invention to determine further parameters that can influence a result of the evaluation method.

The method described with its embodiments is preferably implemented in an item of software. The object set out above is accordingly also achieved via a computer program with program code instructions executable by a computer for implementing the embodiments of the method in accordance with the invention. The computer can be, for example, an automation device with a processing unit in the manner of a processor or the like.

An automation device, in particular an industrial automation device on which such a computer program is implemented is an example of a computer system to which the invention also relates. In place of the automation device, standard computers as are commonly used in office automation can also be considered.

The computer program for implementing the method is typically held on or in a storage medium, thus for example on a magnetic or optical data carrier or in a semiconductor store, so that the invention also relates to a storage medium with a computer program executable by a computer for implementing the method in accordance with the invention and embodiments thereof.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above described properties, features and advantages of this invention as well as the manner and means by which they can be achieved are more clearly and distinctly described in the context of the following description of the exemplary embodiment.

DETAILED DESCRIPTION OF THE EXEMPLARY EMBODIMENT

Figure 1:
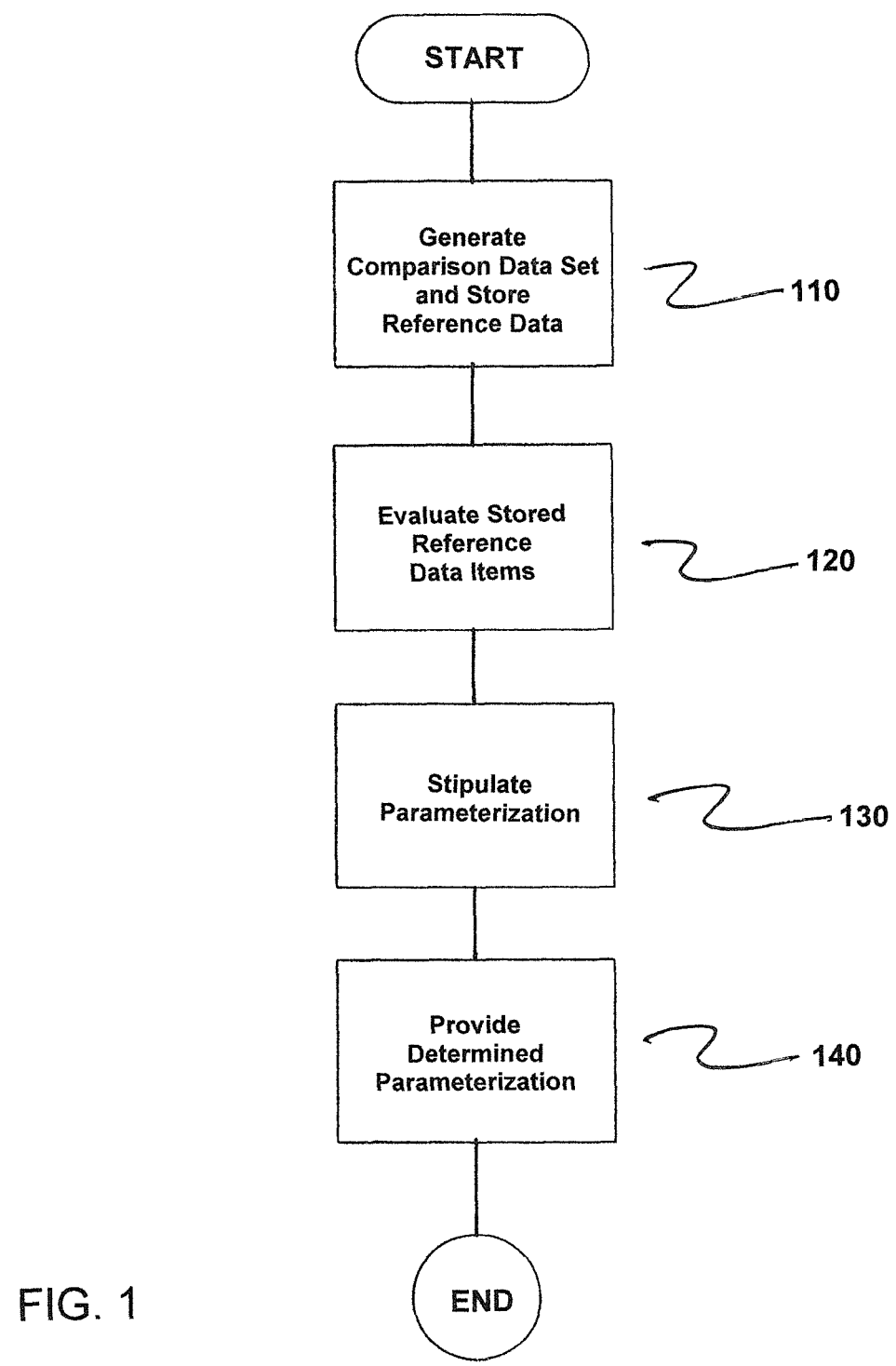
FIG. 1 is a flowchart of the method in accordance with the invention.

The inventive method is used, for example, for determining a parameterization of an evaluation method for recognizing statistical dependencies between process messages of an industrial plant.

For the control or monitoring of a technical process of an industrial processing or manufacturing plant, a plurality of messages is typically generated. Such messages can be, as described above, indications of errors or exceptional situations, e.g. indications of achieved or exceeded limit values and the like. The manner and origin of such messages is extremely varied beyond the examples given and each message generated or processed in the plant should be regarded as included by the designation "message" below.

Initially, via a computer, a comparison archive is generated that has statistical properties comparable with the message archive of the industrial plant. The comparison archive has a quantitatively identical temporal extent, an identical value range of the message identifications contained therein, an identical number of different message identifications, identical message identifications and an identical variance of message identifications.

Subsequently, random messages are generated and placed in the comparison archive. A set of the random messages stored in the comparison archive herein corresponds to the set of messages that are stored in the message archive.

The comparison archive contains random alarm messages with the message identifications "A", "B", "C", "D", "E", "F", "G", "H" and "I". The alarm messages are stored in the following temporal sequence in the comparison archive ("Message ident." is an abbreviation which stands below for "message identification"):

| Time, min. | Message ident. |
|---|---|
| 1 | B |
| 3 | C |
| 5 | D |
| 10 | B |
| 11 | E |
| 12 | A |
| 13 | B |
| 15 | C |
| 16 | F |
| 16 | D |
| 17 | G |
| 17 | A |
| 18 | F |

-continued

| Time, min. | Message ident. |
|---|---|
| 18 | E |
| 18 | B |
| 19 | G |
| 20 | C |
| 20 | H |
| 21 | D |
| 22 | I |
| 23 | H |
| 26 | A |
| 27 | D |
| 28 | D |

In a next step, the message identifications contained in the time range of the comparison archive being considered are identified and their absolute occurrence frequency is determined. The following overview shows the determined absolute occurrence frequencies (as a histogram) of the individual message identifications:

| Message ident. | Frequency |
|---|---|
| A | 3 |
| B | 4 |
| C | 3 |
| D | 5 |
| E | 2 |
| F | 2 |
| G | 2 |
| H | 2 |
| I | 1 |

For the further evaluation, only message identifications that lie above a particular threshold value are taken into account. This is set, by way of example, to the value 3. For the further evaluation, therefore, in the present exemplary embodiment, only the message identifications "A", "B", "C" and "D" are taken into account. With this, the less significant message identifications "E", "F", "G", "H" and "I" can be excluded from the further evaluation, so that the observed subset of the total quantity of message identifications can be lessened, which facilitates the clarity of the results achieved and a further processing thereof.

Subsequently, a frequency matrix and a transition probability matrix are allocated and provided with the value "0". Both matrices have the size (number of message identifications taken into account x number of message identifications taken into account), which in the present exemplary embodiment corresponds to a size of 4×4. In the following, the frequency matrix is shown on the left side and, on the right side, the transition probability matrix:

|   | A | B | C | D |   | A | B | C | D |
|---|---|---|---|---|---|---|---|---|---|
| A | 0 | 0 | 0 | 0 | A | 0 | 0 | 0 | 0 |
| B | 0 | 0 | 0 | 0 | B | 0 | 0 | 0 | 0 |
| C | 0 | 0 | 0 | 0 | C | 0 | 0 | 0 | 0 |
| D | 0 | 0 | 0 | 0 | D | 0 | 0 | 0 | 0 |

Beginning with the chronologically first occurring message identification "B", all the message identifications that occur chronologically after the first message identification "B" are identified. The search ends when the message identification "B" re-occurs. Here, a message with the message identification "C" is present and a message with the message identification "D" between the two message identifications "B". It is herein without significance how often the respective message identifications possibly occur between the two message identifications "B". The corresponding matrix elements of the frequency matrix are increased by 1 so that the following matrices result:

|   | A | B | C | D |   | A | B | C | D |
|---|---|---|---|---|---|---|---|---|---|
| A | 0 | 0 | 0 | 0 | A | 0 | 0 | 0 | 0 |
| B | 0 | 0 | 0 | 0 | B | 0 | 0 | 0 | 0 |
| C | 0 | 1 | 0 | 0 | C | 0 | 0 | 0 | 0 |
| D | 0 | 1 | 0 | 0 | D | 0 | 0 | 0 | 0 |

The last described step is repeated for all the message identifications "B" occurring in the comparison archive, so that the following matrices result:

|   | A | B | C | D |   | A | B | C | D |
|---|---|---|---|---|---|---|---|---|---|
| A | 0 | 2 | 0 | 0 | A | 0 | 0 | 0 | 0 |
| B | 0 | 0 | 0 | 0 | B | 0 | 0 | 0 | 0 |
| C | 0 | 2 | 0 | 0 | C | 0 | 0 | 0 | 0 |
| D | 0 | 2 | 0 | 0 | D | 0 | 0 | 0 | 0 |

In the following step, the transition probability matrix is adapted. The column with the designation "B" of the frequency matrix is selected and divided element-by-element (row-by-row) by the maximum of the absolute occurrence frequency of the message identification "B" and the frequency of the respective message identification in the respective row of the frequency matrix.

The maximum is used in order, in a message identification "B" occurring only sporadically or randomly or very frequently occurring, to arrive at no false statements regarding the transition probability to other message identifications.

Such normalization brings with it the advantage, above all, that frequently occurring message identifications are not given excessive weight. Apart from the use of the maximum, other values are also possible as a reference for the normalization to be performed.

The absolute occurrence frequency of the message identification "B" is 4 in the present exemplary embodiment (see the histogram set out above). The first row element relates to the message identification "A". According to the histogram introduced above, the message identification "A" has an absolute occurrence frequency of 3. The maximum applicable for this matrix element therefore has a value of 4.

The value 2 of the matrix element is divided by 4, so that a value of 0.5 for the corresponding matrix element of the transition probability matrix results. The procedure is repeated accordingly for all the matrix elements of the column "B", so that both matrices have the following form:

|   | A | B | C | D |   | A | B | C | D |
|---|---|---|---|---|---|---|---|---|---|
| A | 0 | 2 | 0 | 0 | A | 0 | 0.5 | 0 | 0 |
| B | 0 | 0 | 0 | 0 | B | 0 | 0 | 0 | 0 |
| C | 0 | 2 | 0 | 0 | C | 0 | 0.5 | 0 | 0 |
| D | 0 | 2 | 0 | 0 | D | 0 | 0.4 | 0 | 0 |

The previously described steps are repeated for the remaining message identifications "A", "C" and "D" so that the following matrices are produced:

|   | A | B | C | D |   | A | B | C | D |
|---|---|---|---|---|---|---|---|---|---|
| A | 0 | 2 | 2 | 3 | A | 0 | 0.5 | 0.67 | 0.6 |
| B | 2 | 0 | 2 | 2 | B | 0.5 | 0 | 0.5 | 0.4 |
| C | 2 | 2 | 0 | 2 | C | 0.67 | 0.5 | 0 | 0.4 |
| D | 2 | 2 | 2 | 0 | D | 0.4 | 0.4 | 0.4 | 0 |

Herein, the following chains of message identifications have been evaluated:
Starting from A: A-B-C-D-A (twice);
Starting from B: B-C-D-B, B-A-B and B-C-D-A-B;
Starting from C: C-D-B-A-B-C and C-D-A-B-C;
Starting from D: D-B-A-B-C-D, D-A-B-C-D, D-A-D and D-D.

For the transition probabilities to be taken into account between a message with a first message identification and a message with a second message identification, a first threshold parameter is determined such that a relative number of pairs of messages, the transition probabilities of which, after the determination of the first threshold parameter, lie above the first threshold parameter to be determined, in relation to all the pairs of messages stored in the comparison archive with a first message identification and messages with a second message identification is quantitatively smaller than a threshold value of 7.5%.

For this purpose, in a sequential or parallel calculation step, different first threshold parameters are selected for the transition probability and in each case, the relative proportion of hits (identified pairs of messages with transition probabilities above the first threshold parameter) in the overall set of message pairs is calculated. Here, the number of hit pairs is one (transition of the message identifications A to D), where the threshold parameter is 0.6 or 60%.

In a subsequent step, frequently occurring chains (3-part, 4-part, 5-part chains, etc.) are identified by message identifications that can be used for a subsequent analysis or further processing. Thereafter, an absolute occurrence frequency of the individual chains is determined.

Following this, a second threshold parameter for a minimum relative occurrence frequency of a chain is determined. The determination occurs in that a relative occurrence frequency of chains that lie quantitatively above the second threshold parameter, in relation to all the chains of message identifications identified in the comparison archive is quantitatively smaller than a threshold value of 20%. For this threshold value, the message identification A-B-C-D-A occurring twice is identified as a hit.

The second threshold parameter corresponds in this case to the second previously determined threshold value, which however does not have to be the case—as the previously described determination of the first threshold parameter shows.

The two previously determined threshold values therefore contribute, firstly, 7.5% and, secondly, 20%. A matching of the threshold values for the individual subparameters is therefore not a precondition for the use of a method in accordance with the invention.

The determined threshold parameters are provided by the inventive method in the last step and can be used in the context of the evaluation method described in a (real) message archive.

FIG. 1 is a flowchart of a method for automated determination of a parameterization of an evaluation method via a computer, where the evaluation method is suitable and is provided for identification of particular partial data items of a data set of an industrial plant. The method comprises, generating a comparison data set and storing reference data in the generated comparison data set, as indicated in step 110. In accordance with the method of the invention, the number of reference data items stored in the generated comparison data set substantially correspond to the number of data items that are part of the data set of the industrial plant and the generated comparison data set includes statistical properties comparable with the data set of the industrial plant.

Next, the evaluation method is utilized to evaluate the reference data items stored in the generated comparison data set, as indicated in step 120.

Next, a parameterization with which the identification of particular partial data items of the reference data items stored in the comparison data set is influenceable via the evaluation method is stipulated, such that a relative number of the particular partial data items identified during the evaluation in relation to all the reference data items stored in the generated comparison data set is quantitatively smaller than a predetermined threshold value, as indicated in step 130.

Next, the determined parameterization for performing the evaluation method to identify particular partial data items of the data set of the industrial plant is provided, as indicated in step 140.

Figure 2:
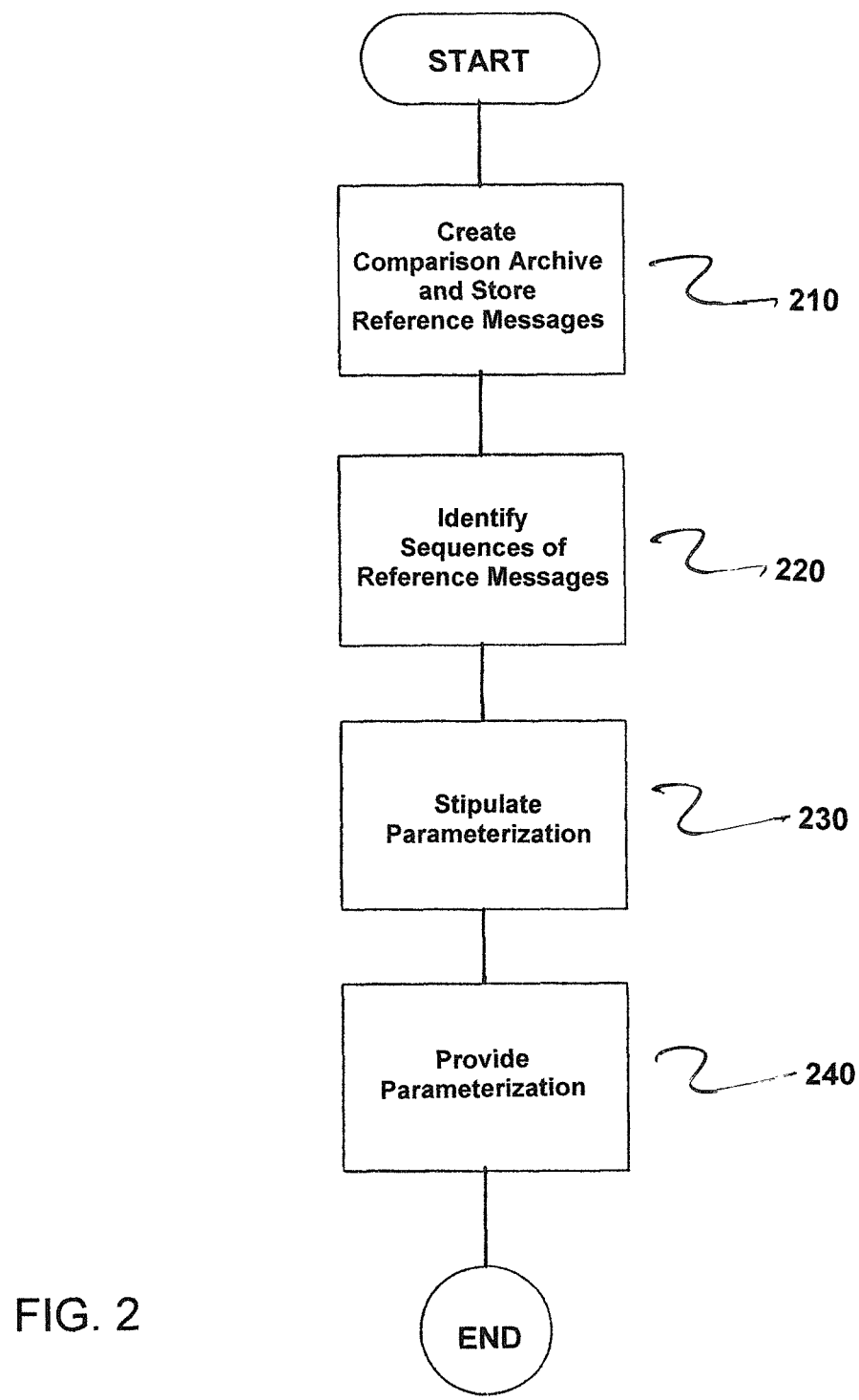
FIG. 2 is a flowchart of the method in accordance with an embodiment.

FIG. 2 is flowchart of a method for automated determination of a parameterization of an evaluation method via a computer in accordance with an embodiment of the invention, where the evaluation method is suitable and is provided for identification of particular sequences of messages placed in a message archive of an industrial plant. The method comprises creating a comparison archive and storing reference messages in the created comparison archive, as indicated in step 210. In accordance with the presently contemplated embodiment, the number of the reference messages stored in the created comparison archive substantially corresponds to the number of messages that are part of a message archive of the industrial plant, and the created comparison archive includes statistical properties comparable with the message archive of the industrial plant.

Next, the evaluation method is utilized to identify particular sequences of reference messages stored in the created comparison archive, as indicated in step 220.

Next, a parameterization with which the identification of particular sequences of messages of the reference messages stored in the comparison archive is influenceable via the evaluation method is stipulated such that a relative number of particular sequences identified during the evaluation in relation to all the sequences stored in the comparison archive is quantitatively smaller than a predetermined threshold value, as indicated in step 230.

Next, the determined parameterization for performing the evaluation method to identify the particular sequences of the messages stored in the message archive is provided, as indicated in step 240.

Figure 3:
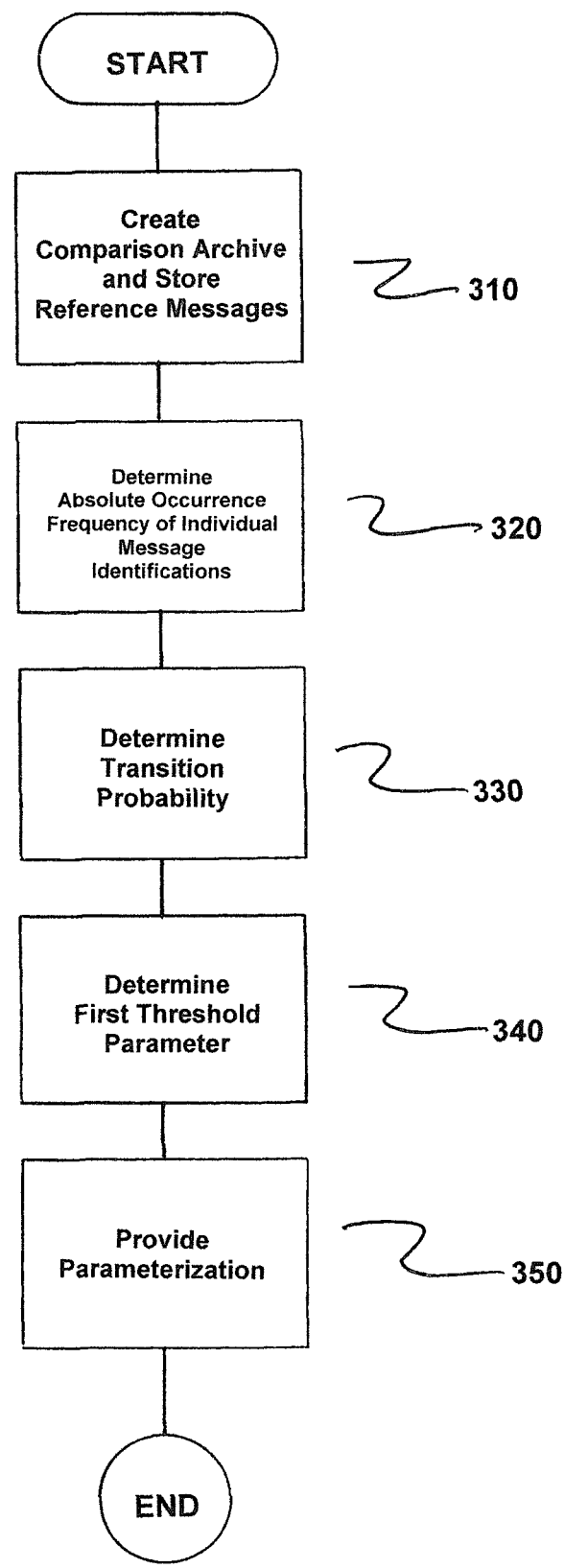
FIG. 3 is a flowchart of the method in accordance with a further embodiment.

FIG. 3 is a flowchart of a method for automated determination of a parameterization of an evaluation method via a computer in accordance with a further embodiment of the invention, where the evaluation method is utilized to evaluate a message archive with a set of messages that are generated during the control or monitoring of an industrial plant, and where the messages include at least two message identifications that differ from one another. The method comprises creating a comparison archive and storing reference messages in the created comparison archive, as indicated in step 310. In accordance with the presently contemplated embodiment, the number of the reference messages stored in the created comparison archive substantially correspond to a set of messages that are stored in the message archive, the created comparison archive including statistical properties comparable with the message archive of the industrial plant.

Next, an absolute occurrence frequency of individual message identifications within a set of reference messages stored in the created comparison archive is determined, as indicated in step 320.

Next, a transition probability of a message with a first message identification to a message with a second message identification in all messages of the reference messages stored in the created comparison archive is determined via a respective absolute occurrence frequency, as indicated in step 330.

Next, a first threshold parameter for a minimum transition probability between two message identifications is now determined such that a relative number of pairs of message identifications, the transition probabilities of which after the determination of the first threshold parameter, lie above the first threshold parameter to be determined, in relation to all the pairs of messages stored in the comparison archive with, as indicated in step 340. In accordance with the present embodiment, in each case, a first message identification and a second message identification is quantitatively smaller than a previously determined threshold value.

Next, a determined parameterization for performing the evaluation method to evaluate the message archive is provided, as indicated in step 350.

Although the invention has been illustrated and described in detail with the preferred exemplary embodiment, the invention is not restricted by the examples given and other variations can be derived therefrom by a person skilled in the art without departing from the protective scope of the invention.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for automated determination of a parameterization of an evaluation method via a computer, the evaluation method being suitable and being provided for identification of particular partial data items of a data set of an industrial plant, the method comprising:
    a) generating a comparison data set and storing reference data in the generated comparison data set, a number of reference data items stored in the generated comparison data set substantially corresponding to a number of data items which are part of the data set of the industrial plant and the generated comparison data set including statistical properties comparable with the data set of the industrial plant;
    b) utilizing the evaluation method to evaluate the reference data items stored in the generated comparison data set;
    c) stipulating a parameterization with which the identification of particular partial data items of the reference data items stored in the comparison data set is influenceable via the evaluation method, such that a relative number of the particular partial data items identified during the evaluation in relation to all the reference data items stored in the generated comparison data set is quantitatively smaller than a predetermined threshold value; and
    d) providing the determined parameterization for performing the evaluation method to identify particular partial data items of the data set of the industrial plant.

2. The method as claimed in claim 1, wherein the industrial plant comprises one of (i) a manufacturing and (ii) processing plant.

3. The method as claimed in claim 1, wherein the statistical properties comprise at least one of (i) a quantitatively identical temporal extent, (ii) an identical value range of the reference data, (iii) an identical number of different data types, (iv) identical data types and (V) an identical variance of data types.

4. The method as claimed in claim 1, wherein the predetermined threshold value is quantitatively smaller than 10%.

5. The method as claimed in claim 4, wherein the predetermined threshold value is quantitatively smaller than 5%.

6. The method as claimed in claim 5, wherein the predetermined threshold value is quantitatively smaller than 1%.

7. The method as claimed in claim 1, wherein said stipulation of the parameterization comprises a step-wise stipulation of a plurality of sub-parameters of the evaluation method.

8. A method for automated determination of a parameterization of an evaluation method via a computer, the evaluation method being suitable and being provided for identification of particular sequences of messages placed in a message archive of an industrial plant, the method comprising:
    a) creating a comparison archive and storing reference messages in the created comparison archive, a number of the reference messages stored in the created comparison archive substantially corresponding to a number of messages which are part of the message archive of the industrial plant, and the created comparison archive including statistical properties comparable with the message archive of the industrial plant;
    b) utilizing the evaluation method to identify particular sequences of reference messages stored in the created comparison archive;
    c) stipulating a parameterization with which the identification of particular sequences of messages of the reference messages stored in the created comparison archive is influenceable via the evaluation method such that a relative number of particular sequences identified during the evaluation in relation to all the sequences stored in the created comparison archive is quantitatively smaller than a predetermined threshold value; and
    d) providing the determined parameterization for performing the evaluation method to identify the particular sequences of the messages stored in the message archive.

9. The method as claimed in claim 8, wherein the industrial plant comprises one of (i) a manufacturing and (ii) processing plant.

10. The method as claimed in claim 8, wherein the statistical properties comprise at least one of (i) a quantitatively identical temporal extent, (ii) an identical value range of the reference messages, (iii) an identical number of different message identifications, (iv) identical message identifications and (v) an identical variance of message identifications.

11. The method as claimed in claim 10, wherein a message identification comprises an allocation to one of (i) a particular machine, (ii) a sensor, (ii) an actuator and (iii) a message class.

12. The method as claimed in claim 8, wherein the predetermined threshold value is quantitatively smaller than 10%.

13. The method as claimed in claim 12, wherein the predetermined threshold value is quantitatively smaller than 5%.

14. The method as claimed in claim 13, wherein the predetermined threshold value is quantitatively smaller than 1%.

15. A method for automated determination of a parameterization of an evaluation method via a computer, the evaluation method is utilized to evaluate a message archive with a set of messages which are generated during at least one of (i) control of an industrial plant and (ii) monitoring of the industrial plant, the messages including at least two message identifications differing from one another, the method comprising:
   a) creating a comparison archive and storing reference messages in the created comparison archive, a number of the reference messages stored in the created comparison archive substantially corresponding to a set of messages which are stored in the message archive, the created comparison archive including statistical properties comparable with a message archive of the industrial plant;
   b) determining an absolute occurrence frequency of individual message identifications within a set of reference messages stored in the created comparison archive;
   c) determining a transition probability of a message with a first message identification to a message with a second message identification in all messages of the reference messages stored in the created comparison archive via a respective absolute occurrence frequency;
   d) determining a first threshold parameter for a minimum transition probability between two message identifications such that a relative number of pairs of message identifications, the transition probabilities of which after the determination of the first threshold parameter, lie above the first threshold parameter to be determined, in relation to all the pairs of messages stored in the comparison archive with, in each case, a first message identification and a second message identification is quantitatively smaller than a previously determined threshold value; and
   e) providing a determined parameterization for performing the evaluation method to evaluate the message archive.

16. The method as claimed in claim 15, wherein the industrial plant comprises one of (i) a manufacturing and (ii) processing plant.

17. The method as claimed in claim 15, wherein the statistical properties comprise at least one of (i) a quantitatively identical temporal extent, (ii) an identical value range of the message identifications, (iii) an identical number of different message identifications, (iv) identical message identifications and (v) an identical variance of message identifications.

18. The method as claimed in claim 17, wherein a message identification comprises an allocation to at least one of (i) a particular machine, (ii) a sensor, (iii) an actuator and (iv) a message class.

19. The method as claimed in claim 15, wherein the predetermined threshold value is quantitatively smaller than 10%.

20. The method as claimed in claim 19, wherein the predetermined threshold value is quantitatively smaller than 5%.

21. The method as claimed in claim 20, wherein the predetermined threshold value is quantitatively smaller than 1%.

22. The method as claimed in claim 15, the method comprises further steps performed between steps d) and e), comprising:
   i) identifying a first message which has a first message identification and a second temporally subsequent message which has a second message identification, an associated transition probability from the first message identification to the second message identification being required to be quantitatively greater than the first threshold parameter for a minimum transition probability between two message identifications and the second message identification being required to be findable in the created comparison archive within a time span to be fixed, starting from the first message identification;
   ii) combining the two identified messages as a two-part chain;
   iii) repeating the steps i) and ii) for each message stored in the created comparison archive;
   iv) starting from a second message of a 2-part chain which has a second message with a second message identification, searching through a set of messages within a stipulated time span for further, temporally subsequent messages until an end of the time span is reached;
   v) taking into account a respective further message if a transition probability of a temporally previous message identification toward a further message identification is quantitatively greater than the first threshold parameter for the minimum transition probability between two message identifications;
   vi) combining the further messages found together with the first and second messages as a further chain;
   vii) repeating steps v) and vi) of each previously identified two-part chain;
   viii) determining an absolute occurrence frequency of individual chains; and
   ix) determining a second threshold parameter for a minimum relative occurrence frequency of a chain such that a relative occurrence frequency of chains that lie quantitatively above the second threshold parameter, in relation to all the chains of message identifications identified in the comparison archive, is quantitatively smaller than a previously determined threshold value.

23. The method as claimed in claim 22, wherein the further chain comprises one of (i) a three-part chain, (ii) a four-part chain and (iii) a five-part chain.

24. The method of claim 22, wherein the predetermined threshold value is quantitatively smaller than 10%.

25. The method of claim 24, wherein the predetermined threshold value is quantitatively smaller than 5%.

26. The method of claim 25, wherein the predetermined threshold value is quantitatively smaller than 1%.

27. A non-transitory storage medium encoded with a computer program which, when executed by a processor of a computer, causes automated determination of a parameterization of an evaluation method via a computer, the evaluation method being suitable and being provided for identification of particular partial data items of a data set of an industrial plant, the computer program comprising:

a) program code instructions for generating a comparison data set and storing reference data in the generated comparison data set, a number of reference data items stored in the generated comparison data set substantially corresponding to a number of data items which are part of the data set of the industrial plant and the generated comparison data set including statistical properties comparable with the data set of the industrial plant;

b) program code instructions for utilizing the evaluation method to evaluate the reference data items stored in the generated comparison data set;

c) program code instructions for stipulating a parameterization with which the identification of particular partial data items of the reference data items stored in the comparison data set is influenceable via the evaluation method, such that a relative number of the particular partial data items identified during the evaluation in relation to all the reference data items stored in the generated comparison data set is quantitatively smaller than a predetermined threshold value; and d) program code instructions for providing the determined parameterization for carrying out the evaluation method for identification of particular partial data items of the data set of the industrial plant.

28. A computer system including the non-transitory storage medium as claimed in claim 27.

* * * * *